United States Patent
Shabbir et al.

(10) Patent No.: US 9,519,323 B2
(45) Date of Patent: Dec. 13, 2016

(54) SYSTEMS AND METHODS FOR POWER AND THERMAL SUPPORT OF INFORMATION HANDLING RESOURCES

(71) Applicant: Dell Products L.P., Round Rock, TX (US)

(72) Inventors: Hasnain Shabbir, Round Rock, TX (US); Akkiah Choudary Maddukuri, Austin, TX (US); Dinesh Kunnathur Ragupathi, Round Rock, TX (US); Robert Daniel Whittington, Austin, TX (US); Carlos Guillermo Henry, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 169 days.

(21) Appl. No.: 14/501,397

(22) Filed: Sep. 30, 2014

(65) Prior Publication Data
US 2016/0091945 A1 Mar. 31, 2016

(51) Int. Cl.
| | | |
|---|---|---|
| G06F 1/26 | (2006.01) | |
| G06F 9/00 | (2006.01) | |
| G06F 15/177 | (2006.01) | |
| G06F 1/32 | (2006.01) | |
| G06F 1/20 | (2006.01) | |
| G06F 9/445 | (2006.01) | |

(52) U.S. Cl.
CPC ............ *G06F 1/3203* (2013.01); *G06F 1/206* (2013.01); *G06F 1/3234* (2013.01); *G06F 9/44505* (2013.01); *G06F 15/177* (2013.01)

(58) Field of Classification Search
CPC ...... G06F 1/3203; G06F 1/206; G06F 1/3234; G06F 9/44505; G06F 15/177
USPC .............................................. 713/1, 100, 300
See application file for complete search history.

(56) References Cited

U.S. PATENT DOCUMENTS

| | | | | |
|---|---|---|---|---|
| 2006/0064999 | A1* | 3/2006 | Hermerding | G06F 1/206 62/259.2 |
| 2010/0095137 | A1* | 4/2010 | Bieswanger | G06F 1/3203 713/300 |
| 2011/0296220 | A1* | 12/2011 | Arai | G03G 15/5004 713/323 |
| 2013/0290758 | A1* | 10/2013 | Quick | G06F 1/3203 713/323 |

(Continued)

*Primary Examiner* — Ji H Bae
(74) *Attorney, Agent, or Firm* — Jackson Walker L.L.P.

(57) ABSTRACT

In accordance with embodiments of the present disclosure, an information handling system may include a processor, one or more information handling resources communicatively coupled to the processor, and a management controller communicatively coupled to the processor. The management controller may have stored thereon at least one of a power table comprising parameters for power management of the one or more information handling resources and a thermal table comprising parameters for thermal management of the one or more information handling resources, and firmware comprising instructions executable on the management controller and configured to enable a user of the information handling system to, during runtime of the management controller, create a virtual power and thermal table capable of storing one or more entries, each entry setting forth power parameters and thermal parameters for an information handling resource.

12 Claims, 1 Drawing Sheet

(56) References Cited

U.S. PATENT DOCUMENTS

2014/0344602 A1* 11/2014 Son .................. G06F 1/3234
                                                    713/323
2015/0198660 A1*  7/2015 Dhanwada ........... G06F 1/26
                                                    324/750.03

* cited by examiner

SYSTEMS AND METHODS FOR POWER AND THERMAL SUPPORT OF INFORMATION HANDLING RESOURCES

TECHNICAL FIELD

The present disclosure relates in general to information handling systems, and more particularly to systems and methods for providing power and thermal support of information handling resources in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As processors, graphics cards, random access memory (RAM) and other components in information handling systems have increased in clock speed and power consumption, the amount of heat produced by such components as a side-effect of normal operation has also increased. Often, the temperatures of these components need to be kept within a reasonable range to prevent overheating, instability, malfunction and damage leading to a shortened component lifespan. Accordingly, air movers (e.g., cooling fans and blowers) have often been used in information handling systems to cool information handling systems and their components.

One challenge in the industry is providing power and thermal budget support of third-party information handling resources in an information handling system. In many instances, power and thermal budget support is provided to a handful of "approved" or "verified" information handling resources in power and thermal budget tables stored in a management controller or other information handling resource. However, once a version of management controller firmware is released, additions to the power or thermal budget tables to add support for another information handling resource (e.g., a Peripheral Component Interconnect-Extended or "PCIe" card) may require reconfiguration or recompilation of management controller firmware, which may delay shipment or release of an information handling system having power and thermal support for the information handling resource. In addition, any unsupported "off-the-shelf" information handling resources added by a customer after delivery may be assigned default parameters with respect to power and thermal budgeting rather than having customized parameters, which may lead to suboptimal performance.

In addition, in existing approaches, if a solution requires a customer thermal table, it is often provided in the form of a personality module that is embedded within the management controller and every time the management controller boots, it looks for the personality module information and loads it into memory. However, if subsequent firmware updates are made to the management controller, new thermal features associated with the firmware update may not be used, as the personality module information may override such updates.

SUMMARY

In accordance with the teachings of the present disclosure, the disadvantages and problems associated with thermal control in information handling systems may be substantially reduced or eliminated.

In accordance with embodiments of the present disclosure, an information handling system may include a processor, one or more information handling resources communicatively coupled to the processor, and a management controller communicatively coupled to the processor. The management controller may have stored thereon at least one of a power table comprising parameters for power management of the one or more information handling resources and a thermal table comprising parameters for thermal management of the one or more information handling resources, and firmware comprising instructions executable on the management controller and configured to enable a user of the information handling system to, during runtime of the management controller, create a virtual power and thermal table capable of storing one or more entries, each entry setting forth power parameters and thermal parameters for an information handling resource.

In accordance with these and other embodiments of the present disclose, a method may include receiving a runtime command from a user of an information handling system to create a virtual power and thermal table of a management controller of the information handling system, the virtual power and thermal table capable of storing one or more entries, each entry setting forth power parameters and thermal parameters for an information handling resource, and the management controller comprising at least one of a power table comprising parameters for power management of one or more information handling resources of the information handling system and a thermal table comprising parameters for thermal management of the one or more information handling resources. The method may also include creating the virtual power and thermal table in response to the command.

In accordance with these and other embodiments of the present disclose, an article of manufacture may include a non-transitory computer readable medium and computer-executable instructions carried on the computer readable medium. The instructions may be readable by a processor, the instructions, when read and executed, for causing the processor to (i) receive a runtime command from a user of an information handling system to create a virtual power and thermal table of a management controller of the information handling system, the virtual power and thermal table capable of storing one or more entries, each entry setting forth power parameters and thermal parameters for an information handling resource, and the management controller comprising at least one of a power table comprising parameters for power management of one or more information handling resources of the information handling system and a thermal table comprising parameters for thermal management of the one or more information handling resources; and (ii) create the virtual power and thermal table in response to the command.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
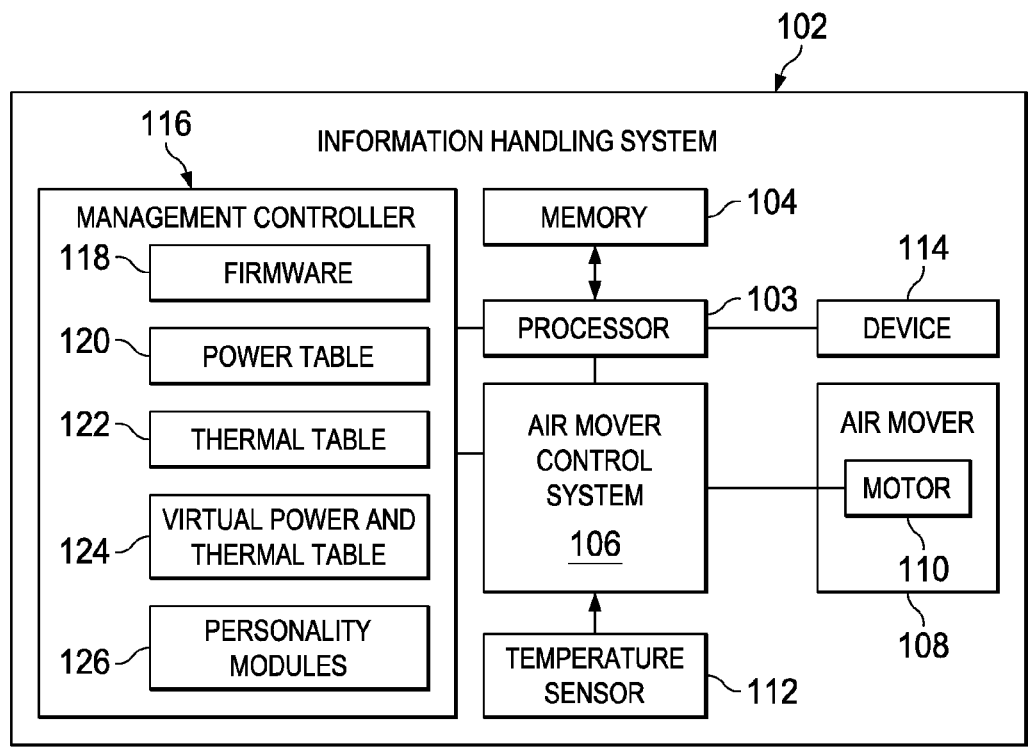
FIG. 1 illustrates a block diagram of an example information handling system, in accordance with the present disclosure.
Figure 2:
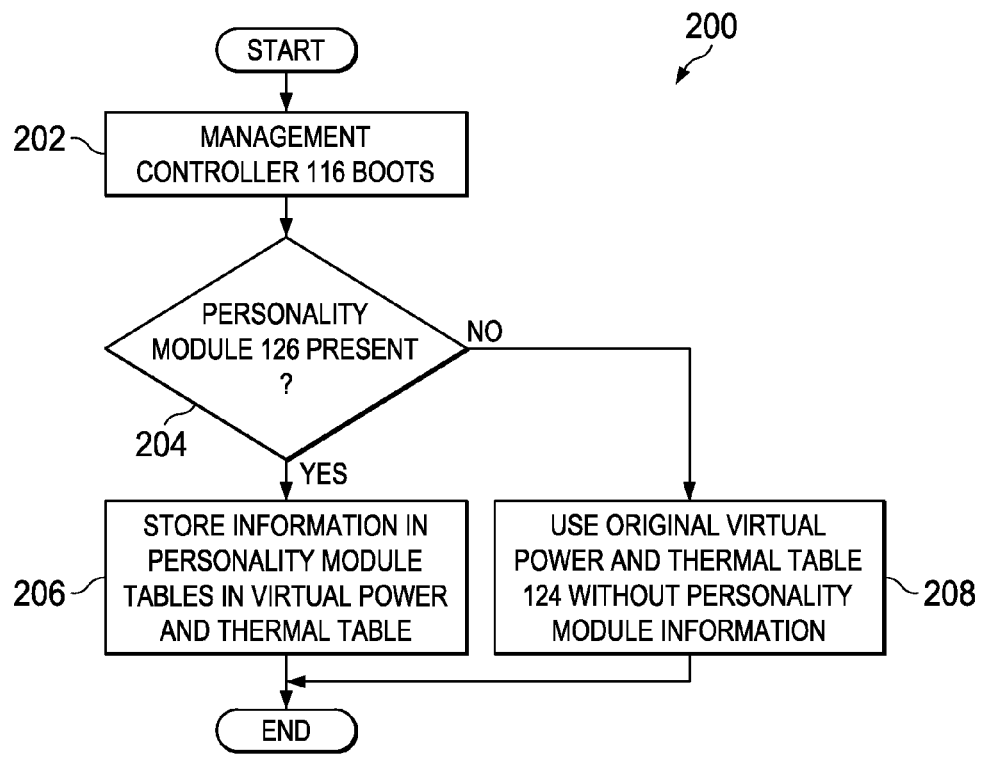
FIG. 2 illustrates a flow chart of an example method for creating a virtual power and thermal table supporting a personality module, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, buses, memories, I/O devices and/or interfaces, storage resources, network interfaces, motherboards, integrated circuit packages; electro-mechanical devices (e.g., air movers), displays, and power supplies.

FIG. 1 illustrates a block diagram of an example information handling system 102, in accordance with the present disclosure. In some embodiments, information handling system 102 may comprise a server chassis configured to house a plurality or servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data. As shown in FIG. 1, information handling system 102 may comprise a processor 103, a memory 104, an air mover control system 106, an air mover 108, a temperature sensor 112, one or more devices 114, and a management controller 116.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102. Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCM-CIA card, flash memory, magnetic storage, opto-magnetic storage, or any suitable selection and/or array of volatile or non-volatile memory that retains data after power to information handling system 102 is turned off.

Air mover control system 106 may be communicatively coupled to processor 103 and may include any system, device, or apparatus configured to receive one or more signals indicative of one or more temperatures within information handling system 102 (e.g., one or more signals from one or more temperature sensors 112), receive information regarding thermal parameters of information handling resources (e.g., information from power and/or thermal tables of management controller 116) and based on such signals and thermal parameters, calculate an air mover driving signal to maintain an appropriate level of cooling, increase cooling, or decrease cooling, as appropriate, and communicate such air mover driving signal to air mover 108.

Air mover 108 may be communicatively coupled to air mover control system 106, and may include any mechanical or electro-mechanical system, apparatus, or device operable to move air and/or other gases. In some embodiments, air mover 108 may comprise a fan (e.g., a rotating arrangement of vanes or blades which act on the air). In other embodiments, air mover 108 may comprise a blower (e.g., centrifugal fan that employs rotating impellers to accelerate air received at its intake and change the direction of the airflow) . In these and other embodiments, rotating and other moving components of air mover 108 may be driven by a motor 110. The rotational speed of motor 110 may be controlled by the air mover control signal communicated from air mover control system 106. In operation, air mover 108 may cool information handling resources of information handling system 102 by drawing cool air into an enclosure housing the information handling resources from outside the chassis, expel warm air from inside the enclosure to the outside of such enclosure, and/or move air across one or more heatsinks (not explicitly shown) internal to the enclosure to cool one or more information handling resources.

A temperature sensor 112 may be any system, device, or apparatus (e.g., a thermometer, thermistor, etc.) configured to communicate a signal to air mover control system 106 indicative of a temperature within information handling system 102.

For ease of exposition, FIG. 1 depicts only one each of air mover control system 106, air mover 108, and temperature sensor 112. However, it is noted that information handling system 102 may include two or more air movers 108 and each such air mover 108 may have a dedicated respective air mover control system 106. It is further noted that an air mover control system 106 may receive temperature signals from one or more temperature sensors 112, and that a single temperature sensor 112 may communicate temperature signals to one or more air mover control systems 106.

In addition to processor 103, memory 104, air mover control system 106, air mover 108, temperature sensor 112, device 114, and management controller 116, information handling system 102 may include one or more other information handling resources.

Device 114 may be communicatively coupled to processor 103 and may generally include any information handling resource. In some embodiments, device 114 may comprise a PCIe device. In these and other embodiments, device 114 may comprise an information handling resource that is not supported by power table 120 and/or thermal table 122 of management controller 116, but for which power and/or thermal information may be entered into an entry associated with device 114 into virtual power and thermal table 124.

Management controller 116 may be configured to provide out-of-band management facilities for management of information handling system 102. Such management may be made by management controller 116 even if information handling system 102 is powered off or powered to a standby state. Management controller 116 may include a processor, memory, out-of-band network interface separate from and physically isolated from an in-band network interface of information handling system 102, and/or other embedded information handling resources. In certain embodiments, management controller 116 may include or may be an integral part of a baseboard management controller (BMC) or a remote access controller (e.g., a Dell Remote Access Controller or Integrated Dell Remote Access Controller). In other embodiments, management controller 116 may include or may be an integral part of a chassis management controller (CMC).

As shown in FIG. 1, management controller 116 may include firmware 118, power table 120, thermal table 122, virtual power and thermal table 124, and personality modules 126. Firmware 118 may include a program of executable instructions configured to be read and executed by management controller 118 in order to carry out the functionality of management controller 118, including that functionality described herein.

Power table 120 may comprise a map, list, array, table, or other suitable data structure with one or more entries, each entry setting forth power parameters (e.g., peak power consumption, idle power consumption, etc.) regarding an information handling resource of information handling system 102. In particular, power table 120 may set forth power parameters for "known" or "supported" information handling resources that may be used in information handling system 102 and may be constructed and stored within a read-only memory of management controller 116 prior to runtime of information handling system 102 (e.g., during factory provisioning) that may only be updated in connection with periodic firmware updates to management controller 116.

Thermal table 122 may comprise a map, list, array, table, or other suitable data structure with one or more entries, each entry setting forth thermal parameters (e.g., target temperature, maximum temperature, etc.) regarding an information handling resource of information handling system 102. In particular, thermal table 122 may set forth thermal parameters for "known" or "supported" information handling resources that may be used in information handling system 102 and may be constructed and stored within a read-only memory of management controller 116 prior to runtime of information handling system 102 (e.g., during factory provisioning) that may only be updated in connection with periodic firmware updates to management controller 116.

Virtual power and thermal table 124 may comprise a map, list, array, table, or other suitable data structure with one or more entries, each entry setting forth power parameters and thermal parameters regarding an information handling resource of information handling system 102. In particular, virtual power and thermal table 124 may comprise or reside in a readable and writable memory of management controller 116 (e.g., non-volatile RAM) to allow for runtime creation of virtual power and thermal table 124 (either by a factory technician or end user) and addition of entries setting forth power and thermal parameters for information handling resources that may be used in information handling system 102. In some embodiments, virtual power and thermal table 124 may support deletion of entries. In these and other embodiments, virtual power and thermal table 124 may be used to store entries for information handling resources other than those "known" or "supported" information handling resources for which information is stored in power table 120 or thermal table 122. Thus, virtual power and thermal table 124 may act as an extension of power table 120 and thermal table 122 and thus may allow for "late" factory additions to power and thermal information without the need to reconfigure firmware 118, power table 120 and/or thermal table 122 which may delay shipment of information handling system 102. In addition, virtual power and thermal table 124 may allow for a customer or end user of information handling system 102 to add entries for information handling resources which do not have corresponding entries in power table 120 or thermal table 122, thus allowing for more customized operation of information handling system 102 including such information handling resources, and allowing such information to remain persistent even as updates and/or patches are made to firmware 118, power table 120, and thermal table 122.

To create virtual power and thermal table 124 and enter information into virtual power and thermal table 124, a user (e.g., factory technician or end user) may interface with management controller 116 in any suitable manner. For example, in some embodiments, a user may interface with management controller 116 via a management console communicatively coupled to an out-of-band network interface of management controller 116 (e.g., via an Intelligent Platform Management Interface or other suitable standard or protocol) as is known in the art. For example, firmware 118 of management controller 116 may be configured so as to enable a user to enter a command-line command to create virtual power and thermal table 124 and further enable the user to add to, edit, or delete from virtual power and thermal table 124 an entry associated with a device 114. Such a command may include command line parameters such as device identifiers (e.g., device, subdevice, vendor, subvendor), type of device, thermal tier, power value, and/or other parameters.

Personality modules 126 may comprise a map, list, array, table, or other suitable data structure with one or more entries, each entry setting forth power parameters and/or thermal parameters regarding an information handling resource of information handling system 102. In existing approaches, if a custom solution requires a custom thermal table, such custom thermal table is provided in the form of a personality module 126 embedded within management controller 116. However, in such approaches, information in a personality module 126 may override power table 120 and thermal table 122, thus losing out on features supported by updates to power table 120 and/or thermal table 122.

To solve this disadvantage, firmware 118 operate such that tables of a personality module 126 act in the same manner as a virtual power and thermal table 124 that acts as an extension to power table 120 and/or thermal table 122. Thus, when new thermal information is added (e.g., via updates to power table 120 and/or thermal table 122) such new thermal information may be utilized while maintaining any key thermal implementation parameters from personality module 126. In doing so, rules may be established within firmware 118 allowing certain features of the original personality module 126 to override that of new parameters to ensure desired functionality of thermal operation. An example method illustrating this functionality of firmware 118 is set forth below in reference to FIG. 2.

FIG. 2 illustrates a flow chart of an example method 200 for creating a virtual power and thermal table 124 with information from a personality module 126, in accordance with embodiments of the present disclosure. According to certain embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen. In these and other embodiments, method 200 may be implemented as firmware, software, applications, functions, libraries, or other instructions.

At step 202, management controller 116 may boot. After boot, at step 204, firmware 118 may determine if personality module 126 is present in management controller 116. If personality module 126 is present, method 200 may proceed to step 206. Otherwise, method 200 may proceed to step 208.

At step 206, in response to determining that personality module 126 is present in management controller 116, firmware 118 may create a virtual power and thermal table 124 to store information in personality module 126 tables, or may append such tables of personality module 126 to an existing virtual power and thermal table 124. After completion of step 206, method 200 may end.

At step 208, in response to determining that personality module 126 is not present in management controller 116, management controller 116 may utilize a virtual power and thermal table 124 without any information from a personality module. After completion of step 208, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using management controller 116, components thereof or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
   a processor;
   one or more information handling resources communicatively coupled to the processor; and
   a management controller communicatively coupled to the processor, and comprising non-transitory computer readable media having stored thereon:
      at least one of a power table comprising parameters for power management of the one or more information handling resources and a thermal table comprising parameters for thermal management of the one or more information handling resources; and firmware comprising instructions executable on the management controller and configured to:

responsive to a request of a user of the information handling system and during runtime of the management controller, create a virtual power and thermal table for storing one or more entries, each entry setting forth power parameters and thermal parameters for an information handling resource; and responsive to a command from the user of the information handling system, modify the virtual power and thermal table during runtime of the management controller.

2. The information handling system of claim 1, wherein modifying the virtual power and thermal table during runtime of the management controller comprises at least one of adding an entry, deleting an entry, and editing an entry of the virtual power and thermal table.

3. The information handling system of claim 1, wherein the at least one of the power table and the thermal table is not capable of being modified during runtime by a user of the information handling system.

4. The information handling system of claim 1, wherein the firmware is further configured to:

determine if a personality module exists at the information handling system; and if the personality module exists, store information of the personality to the virtual power and thermal table.

5. A method comprising:

receiving a first runtime command from a user of an information handling system to create a virtual power and thermal table of a management controller of the information handling system, the virtual power and thermal table for storing one or more entries, each entry setting forth power parameters and thermal parameters for an information handling resource, and the management controller comprising at least one of a power table comprising parameters for power management of one or more information handling resources of the information handling system and a thermal table comprising parameters for thermal management of the one or more information handling resources;

creating the virtual power and thermal table in response to the first command;

receiving a second runtime command from the user to modify the virtual power and thermal table; and modifying the virtual power and thermal table in response to the second command.

6. The method of claim 5, wherein modifying the virtual power and thermal table during runtime of the management controller comprises at least one of adding an entry, deleting an entry, and editing an entry of the virtual power and thermal table.

7. The method of claim 5, wherein the at least one of the power table and the thermal table is not capable of being modified during runtime by a user of the information handling system.

8. The method of claim 5, further comprising:

determining if a personality module exists at the information handling system; and if the personality module exists, storing information of the personality to the virtual power and thermal table.

9. An article of manufacture, comprising:

a non-transitory computer readable medium; and computer-executable instructions carried on the computer readable medium, the instructions readable by a processor, the instructions, when read and executed, for causing the processor to:

receive a first runtime command from a user of an information handling system to create a virtual power and thermal table of a management controller of the information handling system, the virtual power and thermal table for storing one or more entries, each entry setting forth power parameters and thermal parameters for an information handlinp resource, and the management controller comprising at least one of a power table comprising parameters for power management of one or more information handling resources of the information handling system and a thermal table comprising parameters for thermal management of the one or more information handling resources;

create the virtual power and thermal table in response to the first command;

receive a second runtime command from the user to modify the virtual power and thermal table; and modify the virtual power and thermal table in response to the second command.

10. The article of claim 9, wherein modifying the virtual power and thermal table during runtime of the management controller comprises at least one of adding an entry, deleting an entry, and editing an entry of the virtual power and thermal table.

11. The article of claim 9, wherein the at least one of the power table and the thermal table is not capable of being modified during runtime by a user of the information handling system.

12. The article of claim 9, the instructions for further causing the processor to:

determine if a personality module exists at the information handling system; and if the personality module exists, store information of the personality to the virtual power and thermal table.

* * * * *

UNITED STATES PATENT AND TRADEMARK OFFICE
CERTIFICATE OF CORRECTION

| | | |
|---|---|---|
| PATENT NO. | : 9,519,323 B2 | Page 1 of 1 |
| APPLICATION NO. | : 14/501397 | |
| DATED | : December 13, 2016 | |
| INVENTOR(S) | : Shabbir et al. | |

It is certified that error appears in the above-identified patent and that said Letters Patent is hereby corrected as shown below:

In the Claims

Column 10 Line 13 Claim 9 should read:

9. An article of manufacture, comprising:
a non-transitory computer readable medium; and
computer-executable instructions carried on the computer readable medium, the instructions readable by a processor, the instructions, when read and executed, for causing the processor to:
    receive a first runtime command from a user of an information handling system to create a virtual power and thermal table of a management controller of the information handling system, the virtual power and thermal table for storing one or more entries, each entry setting forth power parameters and thermal parameters for an information handling resource, and the management controller comprising at least one of a power table comprising parameters for power management of one or more information handling resources of the information handling system and a thermal table comprising parameters for thermal management of the one or more information handling resources;
    create the virtual power and thermal table in response to the first command;
    receive a second runtime command from the user to modify the virtual power and thermal table; and
    modify the virtual power and thermal table in response to the second command.

Signed and Sealed this
Seventh Day of March, 2017

Michelle K. Lee
*Director of the United States Patent and Trademark Office*